United States Patent [19]
Fukumoto

[11] Patent Number: 6,000,004
[45] Date of Patent: Dec. 7, 1999

[54] NONVOLATILE SEMICONDUCTOR MEMORY DEVICE WITH WRITE PROTECT DATA SETTINGS FOR DISABLING ERASE FROM AND WRITE INTO A BLOCK, AND ERASE AND RE-ERASE SETTINGS FOR ENABLING WRITE INTO AND ERASE FROM A BLOCK

[75] Inventor: Katsumi Fukumoto, Nara, Japan

[73] Assignee: Sharp Kabushiki Kaisha, Osaka, Japan

[21] Appl. No.: 08/884,981

[22] Filed: Jun. 30, 1997

[30] Foreign Application Priority Data

Oct. 23, 1996 [JP] Japan .................................... 8-281147

[51] Int. Cl.$^6$ .................................................. G06F 12/08
[52] U.S. Cl. ..................... 711/103; 711/166; 365/185.04; 365/185.29
[58] Field of Search .................................... 711/152, 166, 711/151, 103; 365/185.04, 185.29, 185.3, 185.11

[56] References Cited

U.S. PATENT DOCUMENTS

| | | | |
|---|---|---|---|
| 4,698,750 | 10/1987 | Wilkie et al. | 364/200 |
| 5,245,570 | 9/1993 | Fazio et al. | . |
| 5,249,158 | 9/1993 | Kynett et al. | . |
| 5,414,664 | 5/1995 | Lin et al. | 365/185.22 |
| 5,544,119 | 8/1996 | Wells et al. | 365/185.11 |
| 5,544,356 | 8/1996 | Robinson et al. | 395/600 |
| 5,566,113 | 10/1996 | Saito et al. | 365/201 |
| 5,596,530 | 1/1997 | Lin et al. | 365/185.29 |
| 5,673,222 | 9/1997 | Fukumoto et al. | 365/185.04 |
| 5,818,771 | 10/1998 | Yasu et al. | 365/145 |

FOREIGN PATENT DOCUMENTS 7-182885 7/1995 Japan .

OTHER PUBLICATIONS

Jerry Jex, "Flash Memory BIOS For PC And Notebook Computers" IEEE Transactions on Computers, pp. 692–695, Jun. 1991.

*Primary Examiner*—John W. Cabeca
*Assistant Examiner*—Pierre-Michel Bataille
*Attorney, Agent, or Firm*—Morrison & Foerster LLP

[57] ABSTRACT

A nonvolatile semiconductor memory device including: a memory cell array for storing data therein in a nonvolatile manner; block protect data storage regions provided for the respective blocks, for storing data therein in a nonvolatile manner; and block protect means for disabling an erase and a write of data from/into a block, if block protect data has been stored in the block protect data storage region of the block and a write protect signal has been activated. The device is characterized by: erase complete data storage regions, provided for the respective blocks, for storing data therein in a nonvolatile manner; erase complete data set means for writing erase complete data into the erase complete data storage region of a block after an erase of data from the block has been completed; and re-erase enable means for enabling an erase of data from a block if the erase complete data has not been stored in the erase complete data storage region of the block, irrespective of a function of the block protect means.

12 Claims, 4 Drawing Sheets

| WSMS | ESS | ES | DWS | VPPS | R2 | R1 | R0 |
|------|-----|----|----|------|----|----|----|
| 7 | 6 | 5 | 4 | 3 | 2 | 1 | 0 Bit |

FIG. 3A
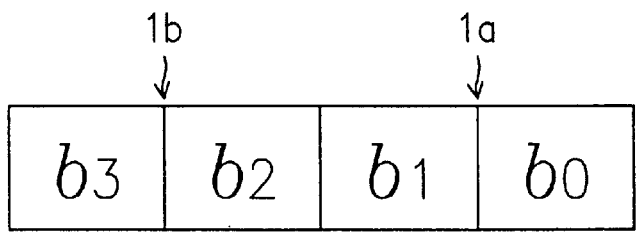
FIG. 3B
| b3 | b2 | Function |
|---|---|---|
| 1 | 0 | Normal end of erase |
| Others | | Abnormal end of erase |
| b1 | b0 | Function |
|---|---|---|
| 1 | 0 | Disable erase/write |
| Others | | Enable erase/write |
FIG. 4
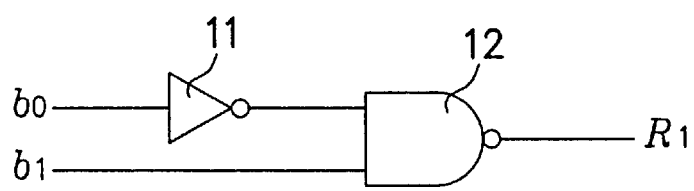

FIG. 7A
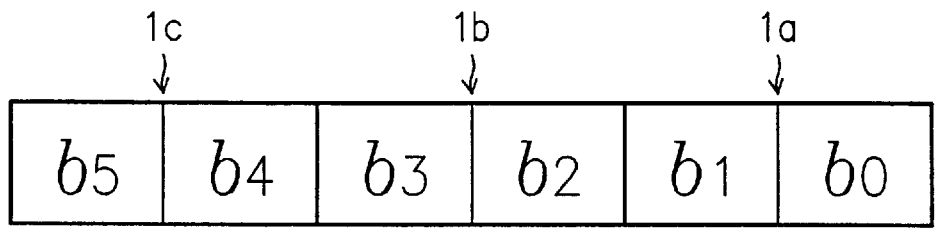
FIG. 7B
| b5 | b4 | Function |
|---|---|---|
| 1 | 0 | Disable unconditional erase/write |
| Others | | Enable unconditional erase/write |
| b3 | b2 | Function |
|---|---|---|
| 1 | 0 | Normal end of erase |
| Others | | Abnormal end of erase |
| b1 | b0 | Function |
|---|---|---|
| 1 | 0 | Disable erase/write |
| Others | | Enable erase/write |
FIG. 8
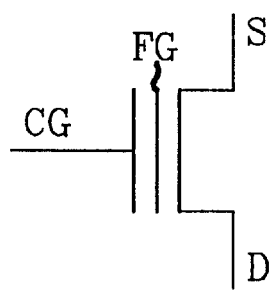

NONVOLATILE SEMICONDUCTOR MEMORY DEVICE WITH WRITE PROTECT DATA SETTINGS FOR DISABLING ERASE FROM AND WRITE INTO A BLOCK, AND ERASE AND RE-ERASE SETTINGS FOR ENABLING WRITE INTO AND ERASE FROM A BLOCK

BACKGROUND OF THE INVENTION

1. Field of the Invention

The present invention relates to a nonvolatile semiconductor memory device which can electrically rewrite data.

2. Description of the Related Art

Conventionally, EPROMs (erasable programmable read-only memories) and EEPROMs (electrically erasable programmable read-only memories) have been generally used as nonvolatile semiconductor memory devices allowing a user to rewrite data stored therein. In an EPROM, data is written by using a write device called "programmer (writer)" and the data stored in all of the memory cells is simultaneously erased by the irradiation of ultraviolet light. Since the EPROM can use a single transistor/single cell structure allowing reduction in area per memory cell, the EPROM is advantageous in that a larger number of memory cells can be easily integrated to realize a larger storage capacity, and less cost per bit. However, since the EPROM requires use of a ceramic package including expensive quartz glass for irradiating UV rays at the time of the erase operation, the cost reduction per chip has limitations. In addition, since a dedicated write device is used for writing data, a chip mounting such a device thereon must be installed into a system via a socket enabling the removal/installation of the chip. Thus, the EPROM is disadvantageous in that the removal/installation of the chip for a write operation is troublesome and that the mounting cost required of such a chip is higher.

On the other hand, an EEPROM is advantageous in that the EEPROM can electrically write or erase data while being permanently installed into the system. However, the EEPROM enables the write and the erase of data on a bit basis and thus requires a select transistor for each memory cell. Consequently, the area per memory cell of the EEPROM becomes one and a half times to twice as large as that of the EPROM so that the cost per bit increases. Thus, the EEPROM is disadvantageous for realizing a larger-capacity memory device.

In order to solve such problems, a flash memory has been developed as a nonvolatile semiconductor memory device having the advantages of the EPROM in combination with those of the EEPROM. As shown in FIG. 8, the memory cell of such a flash memory is implemented as a cell transistor having a floating gate type FET structure in which a floating gate FG is disposed in a gate oxide film, provided under the control gate CG of a MOSFET (metal-oxide-semiconductor field effect transistor), so as to be insulated from the control gate CG, as disclosed in U.S. Pat. Nos. 5,249,158 and 5,245,570, for example. The floating gate type cell transistor has a similar structure to that of an EPROM or an EEPROM. However, the flash memory simultaneously erases data stored in such cell transistors on a chip basis or on a block basis, thereby obviating the memory cell select transistors and enabling a single transistor/single cell structure. Thus, the cost per bit of the flash memory becomes as inexpensive as that of the EPROM, and the flash memory is suitable for realizing a larger-capacity memory device. In addition, since the flash memory can electrically write and erase data in the same way as the EEPROM, an inexpensive plastic package can be used therefor and it is no longer necessary to remove and install a chip therefrom/thereto unlike the EPROM. The flash memory is generally formed as a NOR type in which cell transistors are connected to a bitline one by one or as a NAND type in which a plurality of serially connected cell transistors are simultaneously connected to a bitline. Though a flash memory of a NAND type has lower read speed when random access is performed, the flash memory is advantageous in that the area per memory cell can be further reduced because the area required for connecting cell transistors to a bitline can be reduced as compared with a flash memory of a NOR type. It is noted that flash memories of an AND type and flash memories of a DINOR type have also been proposed. However, in the flash memories of the AND type and the DINOR type, the electrons are injected into and drained from the floating gate FG at the times of an erase operation and a write operation, respectively, in the opposite manner to that of the flash memories of the NOR type and the NAND type. Thus, in the following description, only the flash memories of the NOR type and the NAND type will be described.

The cell transistor of the flash memory stores data representing whether or not electrons have been accumulated in the floating gate FG thereof as "0" or "1", respectively. More specifically, when the data is read out from a cell transistor of the flash memory, the source S thereof is grounded (=0 V), a low voltage of about 1 V is applied to the drain D thereof and a power supply voltage VCC (generally about 5 V) is applied to the control gate CG thereof. Then, if electrons have not been accumulated in the floating gate FG, the drain D becomes conductive with the source S so that drain current (or channel current) flows between the drain D and the source S because the threshold voltage of the cell transistor is low. On the other hand, if electrons have been accumulated in the floating gate FG, then the threshold voltage of the cell transistor becomes higher. As a result, the drain D remains isolated from the source S so that drain current hardly flows therebetween. Thus, by detecting the level of the drain current, the data stored in the cell transistor can be read out. As mentioned above, the voltage applied to the drain D at the time of the read operation is set at as low as about 1 V. Such an application of a low voltage is intended for preventing a case where a parasitic weak write (soft write) occurs owing to the application of a high voltage. It is noted that, in the following description, the data "0" represents a state where electrons have been accumulated in the floating gate FG and a threshold voltage is high and the data "1" represents a state where electrons have not been accumulated in the floating gate FG and a threshold voltage is low.

When the data stored in the cell transistor of the flash memory is erased, a high voltage of about 12 V is applied to the source S and the control gate CG is grounded. Then, a high electric field is generated between the floating gate FG and the source S so that the electrons accumulated in the floating gate FG are drained by a tunnel current via a thin gate oxide film. As a result, the threshold voltage of the cell transistor is decreased, the cell transistor is initialized into a state where the data "1" is stored and the data is erased. The data is erased simultaneously on a chip basis or on a block basis, as described above.

However, in such an erase method, since a high voltage is applied to the source S, the source junction must have an increased withstand voltage. Thus, it becomes more difficult to fabricate the source electrode because a finer fabrication technique is required for the source electrode. In addition, a part of the hot holes generated in the vicinity of the source junction are trapped into the gate oxide film so that the reliability of the cell transistor is disadvantageously degraded. Thus, a negative gate erase method in which a power supply voltage VCC (generally about 5 V) is applied to the source and a negative voltage of about −10 V is applied to the control gate CG, thereby draining the electrons accumulated in the floating gate FG by a tunnel current has also been proposed. According to the negative gate erase method, since the voltage to be applied to the source S becomes lower, the withstand voltage of the source junction can be advantageously reduced and the gate length of the cell transistor can be advantageously shortened. In the erase method in which a high voltage is applied to the source S, since the inter-band tunnel current flowing at the time of the erase operation reaches as high as several mA on the entire chip, a generally used booster circuit having a low current supply ability cannot supply such a high voltage and thus a high erase voltage Vpp must be supplied from an external power supply. On the other hand, in the case of employing the negative gate erase method, since the power supply voltage VCC has only to be applied to the source S, a single power supply erase operation requiring only the supply of the power supply voltage VCC to the flash memory is realized relatively easily.

When data is written to the cell transistor of the flash memory, a high voltage of about 12 V is applied to the control gate CG, the source S is grounded (=0 V) and a voltage of about 7 V is applied to the drain D. Then, a large amount of current flows between the drain D and the source S so that the high-energy hot electrons generated in the vicinity of the drain junction are injected into the floating gate FG and accumulated therein. As a result, the data "0" is stored. In other words, the data write operation can only rewrite the initialized data "1" of the cell transistor into "0" and cannot rewrite the data "0" into "1". Thus, when the data stored in the cell transistors is rewritten in the flash memory, an erase operation is first performed, thereby initializing once the data stored in the cell transistors within the chip or the block. Thereafter, the write operation must be performed by selecting only the cell transistors in which the data "0" are to be stored.

It is noted that, in such a method in which the electrons are injected into the floating gate FG by using the hot electrons, a large amount of current of about 1 mA is required to be supplied to the cell transistors at the time of the write operation. Thus, a flash memory in which the current required of the write operation is reduced by the injection of the electrons using FN tunnel current in the same way as in a common EEPROM has also been developed.

Moreover, in the cell transistor of the flash memory, the write operation is performed in the vicinity of the drain junction, and the erase operation is performed in the vicinity of the source junction. Thus, in designing such a device, the profiles of these junctions are preferably optimized in accordance with the respective operations. More specifically, the cell transistor preferably has an asymmetric structure between the drain junction and the source junction in which an electric field concentrated profile is used for the drain junction in order to improve the write efficiency, and an electric field dispersed profile is used for the source junction in order to enable the application of a high voltage at the time of the erase operation.

Furthermore, since various types of battery-driven portable electronic equipment have become more and more popular, and finer semiconductor fabrication processes have been realized in recent years, it is desirable to reduce the power supply voltage for driving a semiconductor device. Reflecting such tendencies, various semiconductor devices requiring a power supply voltage VCC reduced from 5 V to 3.3 V have recently been the subject of intense development. As a result, flash memories of the above-described type requiring a power supply voltage of 3.3 V have also been developed. However, under current circumstances, even in such a flash memory requiring a power supply voltage of 3.3 V, the voltage to be applied to the control gate CG of the cell transistor during a read operation is still set at about 5 V, which has been boosted from the power supply voltage VCC of 3.3 V by a word line booster circuit provided inside the chip, for accelerating the operating speed and sufficiently enlarging the operating margin.

Unlike a RAM (random access memory) and the like, the flash memory has a lot of operation states including not only the data write and read operations, but also a block erase operation, a chip simultaneous erase operation and a read operation from a status register. Thus, if any of these operation states is to be specified by combining externally supplied control signals such as a chip enable signal /CE, a write enable signal /WE and an output enable signal /OE, new control signals should be determined in addition to the control signals of a conventional EPROM or EEPROM, and additional input terminals associated with the respective control signals should also be provided. In such a case, the flash memory cannot be used conveniently. Thus, in flash memories currently in use, each of the operation states is specified not by the combination of control signals, but mainly by the combination of data and addresses to be input as a command. In such a flash memory, a command state machine CSM determines the type of an externally input command, and a write state machine WSM executes a corresponding operation in response to the command.

Furthermore, the flash memories performing the erase operation on a block basis use either blocks (or erase blocks) of unequal sizes or blocks of an equal size (U.S. Pat. No. 5,245,570). In such a flash memory including a plurality of blocks, a BP (block protect) data storage region for storing BP data therein is sometimes provided for each of the blocks in order to protect the data stored in each block. In this case, if the BP data is stored in the BP data storage region, then the erase and the write of data from/into the block are prohibited in principle. Also, such a flash memory includes a /WP input terminal for inputting an externally supplied write protect signal /WP. The write protect signal /WP is a control signal to validate the BP data stored in the BP data storage region in each block when activated (L level) and to invalidate the BP data when deactivated (H level). Thus, only when the write protect signal /WP to be input to the /WP input terminal has been activated (L level), the erase operation and the write operation are prohibited with respect to a block in which the BP data is stored in the BP data storage region. In the other cases, the erase operation and the write operation can be executed.

It is noted that a WP set command and a WP release command are sometimes provided instead of providing such a /WP input terminal. That is to say, when a WP set command is input by the above-described command input method, a WP signal inside the device is activated (H level). On the other hand, when a WP release command is input, the WP signal is deactivated (L level), thereby controlling the validity and invalidity of the BP data. Such a command input method obviates the /WP input terminal and realizes a compatibility with the input terminal of a conventional EPROM or EEPROM.

However, in the cell transistor of the flash memory, when an excessive erase results from the drainage of an excessive amount of electrons from the floating gate FG during the erase operation, the threshold voltage of the cell transistor becomes a negative voltage. If the threshold voltage of the cell transistor becomes a negative voltage in such a manner, then leak current also flows from a non-selected cell transistor because a select transistor for selecting a cell transistor is not provided. As a result, it is no longer possible to correctly read the data out from another cell transistor selected on the same bitline and therefore, a critical defect is caused in the flash memory.

Thus, in order to prevent such excessive erasing during the erase operation, the flash memory first performs a "program before erase", thereby accumulating electrons in the floating gates FG of all of the cell transistors from which the data are to be erased (or writing the data "0") and preventing the electrons from being forcibly drained from the floating gates FG of the remaining cell transistors in which the electrons have not been accumulated by the erase operation. Thereafter, the erase operation by the application of a high voltage or the like is performed for a short time and then an erase verification operation is performed to determine whether or not the erase operation has been completely performed. The erase verification operation is repeatedly performed until a cell transistor from which the data has not been erased sufficiently no longer exists, thereby preventing the erase operation from being performed for a longer time than necessary.

Thus, the flash memory requires an extremely long time (on the order of several hundreds of milliseconds) for the erase operation. It is rather possible that the erase operation is forced to end in the middle thereof by a cutoff of power or the input of a device reset signal. If the erase operation ends abnormally in the middle thereof, all the data stored in the cell transistors is not initialized into "1" (small threshold voltage) but some of the data may remain "0" (large threshold voltage) in some cases. Herein, the write operation is performed only by rewriting the initialized stored data "1" into "0", as described above. Thus, when the data "1" is desired to be written, the initialized data "1" stored in the cell transistors is actually left as it is. Thus, if there are some cell transistors in which the data has not been initialized but remains "0", then it is impossible to write data "1" into such cell transistors.

As a result, in a conventional flash memory, it is necessary to always keep in mind the possibility that the data has not been erased completely during the write operation after the erase operation of data has been performed, and therefore a program of a system using such a flash memory is adversely complicated. Consequently, the procedure for operating a conventional flash memory is disadvantageously troublesome. That is to say, even if one tries to detect an abnormal end of an erase operation before a write operation is performed, a conventional flash memory provides no means for easily enabling such a detection. For example, a bit ES indicating whether the erase has succeeded or failed is provided for a status register of a flash memory. However, if the power is cut off or a device reset signal is input, then the status register is also reset. Thus, in such a case, the abnormal end cannot be detected by the status register. Therefore, in order to detect such an abnormal end of the erase operation, there is no means other than reading out all the data from all the memory cells and verifying the normal erase thereof one by one. Further-more, in the case where a write operation has been performed, a rewrite operation is repeatedly performed until it is determined by the write verification that the data "0" has been written correctly. However, if the write of the data "1" is disabled by the abnormal end of the erase operation, the rewrite operation cannot be performed and another error correction procedure is required.

In addition, the BP data storage region in each block is generally a region for storing one bit of BP data therein. Therefore, when the data stored in the block is erased, the BP data is also cleared and an erase/write enable state is re-established. However, in the erase operation, the data "0" is written by the program before erase operation and then initialized into "1", as described above. Thus, if the erase operation abnormally ends on any stage thereof because of the abnormality of a power supply potential or the influence of a noise, the BP data is erroneously written into the BP data storage region irrespective of whether the BP data is "0" or "1". As a result, there is a possibility that an erase/write disable state is unintentionally caused. For example, assuming that the data "1" initialized by the erase operation represents an erase/write enable state and "0" represents the BP data, the abnormal end of the erase operation immediately after the program before erase causes the BP data to be stored in the BP data storage region. Moreover, in this case, if the /WP signal input to the /WP input terminal has been activated (L level) or the WP signal has been activated (H level) by the input of a WP set command, then the /WP signal must be deactivated (H level) or the WP signal must be deactivated (L level) by the input of a WP release command, and then the erase operation must be performed again.

Consequently, in order to simply perform again an erase operation even in the case where the BP data is stored in the BP data storage region and an erase/write disable state is caused because of the abnormal end of the erase operation, a circuit for switching the /WP signal to be input to the /WP input terminal or an error correction routine for inputting a WP release command must be additionally provided for a conventional flash memory. As a result, the circuit configuration or the program of a system using such a flash memory is disadvantageously complicated.

SUMMARY OF THE INVENTION

The nonvolatile semiconductor memory device of the present invention enables an erase of data from at least one of blocks obtained by dividing a memory cell array, on the basis of each of the blocks and enables a write of data only to the at least one block from which the data has been erased. The nonvolatile semiconductor memory device includes: the memory cell array for storing data therein in a nonvolatile manner; block protect data storage regions, provided for the respective blocks, for storing data therein in a nonvolatile manner; and block protect means for disabling an erase and a write of data from/into a block, if block protect data has been stored in the block protect data storage region of the block and a write protect signal has been activated. The non-volatile semiconductor memory device further includes: erase complete data storage regions, provided for the respective blocks, for storing data therein in a nonvolatile manner; erase complete data set means for writing erase complete data into the erase complete data storage region of a block after an erase of data from the block has been completed; and re-erase enable means for enabling an erase of data from a block if the erase complete data has not been stored in the erase complete data storage region of the block, irrespective of a function of the block protect means.

In one embodiment, the re-erase enable means disables a write of data into a block if the erase complete data has not been stored in the erase complete data storage region of the block, irrespective of the function of the block protect means.

In another embodiment, the re-erase enable means disables a write of the block protect data into the block protect data storage region of a block if the erase complete data has not been stored in the erase complete data storage region of the block.

In still another embodiment, each of the block protect data and the erase complete data is compose of a series of at least two bits in which a previously written bit is a bit representing a state where an erase has been performed and a subsequently written bit is a bit representing an inversed state thereof, and the block protect data of at least two bits and the erase complete data of at least two bits are respectively stored in each of the block protect data storage regions and each of the erase complete data storage regions in a nonvolatile manner.

In still another embodiment, the nonvolatile semiconductor memory device further includes block status data read means for reading out the data stored in the block protect data storage region and the data stored in the erase complete data storage region.

In still another embodiment, the nonvolatile semiconductor memory device further includes unconditional block protect data storage regions, provided for the respective blocks, for storing data therein in a nonvolatile manner, and unconditional block protect means for disabling an erase and a write of data from/into a block, if unconditional block protect data has been stored in the unconditional block protect data storage region of the block, irrespective of the write protect signal.

In still another embodiment, the re-erase enable means disables a write of the unconditional block protect data into the unconditional block protect data storage region of a block if the erase complete data has not been stored in the erase complete data storage region of the block.

In still another embodiment, the unconditional block protect data is composed of a series of at least two bits in which a previously written bit is a bit representing a state where an erase has been performed and a subsequently written bit is a bit representing an inversed state thereof, and the unconditional block protect data of at least two bits is stored in each of the unconditional block protect data storage regions in a nonvolatile manner.

In still another embodiment, the nonvolatile semiconductor memory device further includes unconditional block protect data read means for reading out the data stored in the unconditional block protect data storage region.

The nonvolatile semiconductor memory device according to another aspect of the present invention enables a direct rewrite of data in at least one of blocks obtained by dividing a memory cell array and includes: the memory cell array for storing data therein in a nonvolatile manner; block protect data storage regions, provided for the respective blocks, for storing data therein in a nonvolatile manner; and block protect means for disabling a rewrite of data in a block, if block protect data has been stored in the block protect data storage region of the block and a write protect signal has been activated. The nonvolatile semiconductor memory device further includes: rewrite invalid data storage regions, provided for the respective blocks, for storing data therein in a nonvolatile manner; rewrite invalid data set means for writing rewrite invalid data into the rewrite invalid data storage region of a block when a rewrite operation of data in the block has not ended normally; and data rewrite disable means for disabling a rewrite of data in a block if the rewrite invalid data has been stored in the rewrite invalid data storage region of the block, irrespective of a function of the block protect means.

In one embodiment, the data rewrite disable means disables a write of the block protect data into the block protect data storage region of a block if the rewrite invalid data has been stored in the rewrite invalid data storage region of the block.

Hereinafter, the functions or the effects to be attained by the present invention will be described.

According to the present invention, if the erase operation of a block in a flash memory or the like has not ended normally (i.e., ended abnormally), the erase complete data set means does not write the erase complete data into the erase complete data storage region. Thus, the re-erase enable means enables the erase of the data from the block. Thus, in the case where the erase of a block has ended abnormally and the erase of the block is possibly incomplete, even when the write protect signal has been activated and data coinciding with the block protect data has been stored in the block protect data storage region of the block, the re-erase of the block can be executed instantaneously. As a result, it is no longer necessary to deactivate the write protect signal.

In addition, according to the present invention, in the case where the erase of a block has ended abnormally, the re-erase enable means not only enables the re-erase of the data from the block, but also disables the write of data into the block. Thus, it is possible to prevent data from being erroneously written into a block without knowing that the data may have been erased incompletely from the block.

Moreover, according to the present invention, in the case where the erase of a block has ended abnormally, the re-erase enable means not only enables the re-erase of the data from the block, but also disables the write of block protect data into the block protect data storage region of the block. Thus, it is possible to prevent data in the block from being erroneously protected without knowing that the data may have been erased incompletely from the block.

Furthermore, according to the present invention, each of the block protect data and the erase complete data is composed of 2 bits or more. Thus, it is less likely that the data stored in the block protect data storage region and the erase complete data storage region happen to coincide with the block protect data and the erase complete data, respectively, because of the abnormal end of the erase. Also, since the data is composed of at least two mutually inversed bits, it is even less likely that the data stored in the block protect data storage region and the erase complete data storage region happen to coincide with the block protect data and the erase complete data, respectively. Furthermore, the previously written one of the pair of bits is a bit representing a state where the erase has been performed. Thus, in a nonvolatile semiconductor memory device in which a program before erase for writing data representing a state inversed to the data-erased state is performed before the erase operation is performed, even if the program before erase ends abnormally in the middle thereof, the written data does not happen to coincide with the block protect data or the erase complete data.

Furthermore, according to the present invention, the block status data read means can determine whether or not the erase complete data has been stored in the erase complete data storage region. Thus, it is easy to externally determine whether or not the erase operation of the block has ended normally. Similarly, the block status data read means can also determine whether or not the block protect data has been stored in the block protect data storage region. Thus, it is easy to determine whether or not the data in each block is protected.

Furthermore, according to the present invention, in the case where the unconditional block protect data has been stored in the unconditional block protect data storage region, the unconditional block protect means unconditionally disables the erase of the data from the block and the write of data into the block. Thus, it is possible to protect the data in an arbitrary block irrespective of the write protect signal.

Furthermore, according to the present invention, in the case where the erase of a block has ended abnormally, the re-erase enable means not only enables the re-erase of the data from the block, but also disables the write of unconditional block protect data into the unconditional block protect data storage region of the block. Thus, it is possible to prevent data in the block from being unconditionally protected without knowing that the data may have been erased incompletely from the block.

Furthermore, according to the present invention, the unconditional block protect data is composed of 2 bits or more. Thus, it is less likely that the data stored in the unconditional block protect data storage region happens to coincide with the unconditional block protect data because of the abnormal end of the erase. Also, since the unconditional block protect data is composed of at least two mutually inversed bits, it is even less likely that the data stored in the unconditional block protect data storage region happens to coincide with the unconditional block protect data. Furthermore, the previously written one of the pair of bits is a bit representing a state where the erase has been performed. Thus, in a nonvolatile semiconductor memory device in which a program before erase for writing data representing a state inversed to the data-erased state is performed before the erase operation is performed, even if the program before erase ends abnormally in the middle thereof, the written data does not happen to coincide with the unconditional block protect data.

Furthermore, according to the present invention, the unconditional block protect data read means can determine whether or not the unconditional block protect data has been stored in the unconditional block protect data storage region. Thus, it is easy to determine whether or not the data in each block is protected.

According to another aspect of the present invention, if the rewrite operation of data in a nonvolatile semiconductor memory device using a ferroelectric material or the like has not ended normally (or ended abnormally), the rewrite invalid data set means writes the rewrite invalid data into the rewrite invalid data storage region. Thus, the data rewrite disable means disables the rewrite of the data in the block. Thus, in the case where the rewrite of data in a block has ended abnormally and the data of the block is possibly incomplete, it is possible to prevent the data from being erroneously written into the block even if the write protect signal has been deactivated or if the block protect data has not been stored in the block protect data storage region of the block.

Furthermore, according to the present invention, in the case where the rewrite of data in a block has ended abnormally, the data rewrite disable means not only disables the rewrite of the data in the block, but also disables the write of block protect data into the block protect data storage region of the block. Thus, it is possible to prevent data in the block from being erroneously protected without knowing that the data may be incomplete.

Thus, the invention described herein makes possible the advantage of providing a nonvolatile semiconductor memory device which can easily deal with the abnormal end of an erase operation by writing erase complete data into an erase complete data storage region if the erase operation has normally ended and by unconditionally enabling the erase operation if the erase complete data has not been stored in the erase complete data storage region.

This and other advantages of the present invention will become apparent to those skilled in the art upon reading and understanding the following detailed description with reference to the accompanying figures.

BRIEF DESCRIPTION OF THE DRAWINGS

FIG. 3A is a diagram showing the data arrangements in a BP data storage region and an EC data storage region, respectively, and FIG. 3B shows tables illustrating the functions of the two regions in accordance with the contents of the data stored therein in the example of the present invention.

FIG. 4 is a circuit diagram of a circuit for reading out the data stored in the BP data storage region in the example of the present invention.

FIG. 7A is a diagram showing the data arrangements in the BP data storage region, the EC data storage region and an unconditional BP data storage region, respectively, and FIG. 7B shows tables illustrating the functions of the three regions in accordance with the contents of the data stored therein in the example of the present invention.

FIG. 8 is a circuit diagram of a cell transistor used for a memory cell of a flash memory.

DESCRIPTION OF THE PREFERRED EMBODIMENTS

Hereinafter, a preferred embodiment of the present invention will be described with reference to the accompanying drawings.

Figures 1, 2:
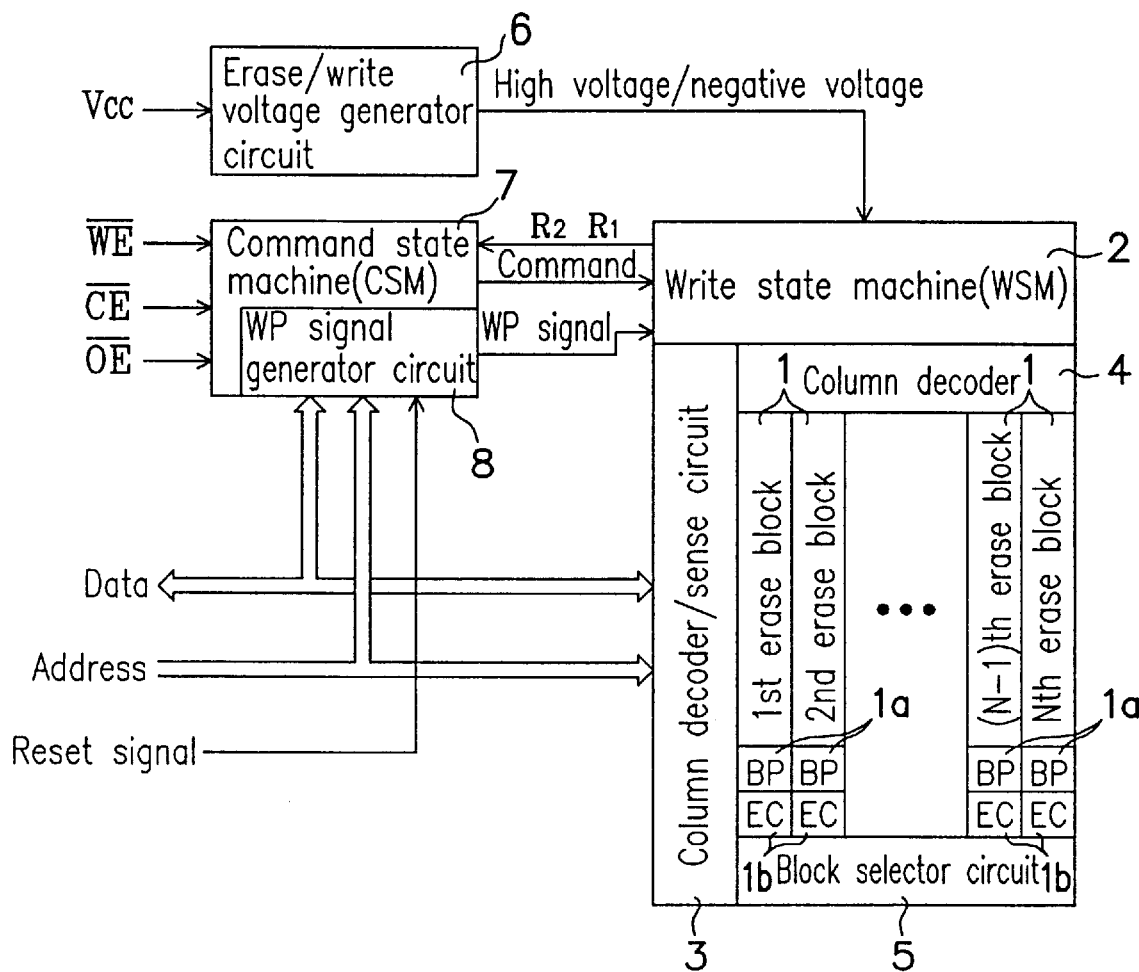
FIG. 1 is a block diagram showing a configuration of a flash memory in an example of the present invention.
FIG. 2 is a diagram showing the contents of the respective bits in a status register in the example of the present invention.

FIGS. 1 to 7B illustrate an example of the present invention. In the following example, the present invention will be described as being applied to a flash memory as an exemplary nonvolatile semiconductor memory device. In the flash memory, a memory cell array is divided into a number N of blocks 1 as shown in FIG. 1. The respective blocks 1 may be either of the same size (i.e., have the same number of bits) or of different sizes. A memory cell array composed of blocks of equal size is called a "memory cell array of an even block type", while a memory cell array composed of blocks of unequal sizes is a "memory cell array of a boot block type", for example. In such a boot block type memory cell array, boot blocks enabling an erase and a write only when a high voltage is applied to a particular terminal are provided separately from the blocks 1 shown in FIG. 1. It is noted that the blocks 1 are called "sectors" in a flash memory used for an HDD (hard disk drive) compatible system or the like.

In the flash memory, a block protect (BP) data storage region 1a and an erase complete (EC) data storage region 1b are provided for each of the block 1. Each of the BP data storage region 1a and the EC data storage region 1b is a storage region of one bit or more in which data is stored in a nonvolatile manner, and may be provided either as a part of each block 1 in the memory cell array or as a nonvolatile storage region formed separately from the memory cell array. As will be described in detail later, the BP data storage region 1a disables the erase and the write of data from/into the block 1 (to which the region 1a belongs) and thereby protects the data stored therein, if the BP (block protect) data has been stored in the BP data storage region la. On the other hand, the EC data storage region 1b indicates that the erase operation from the block 1 has ended normally, if the EC (erase complete) data has been stored in the EC data storage region 1b.

A write state machine 2 is a circuit for performing a write (program) operation for writing data into the memory cells included in blocks 1 or an erase operation for erasing the data stored in memory cells on a block 1 basis. A column decoder/sense circuit 3 select a word line in response to an externally input address, while a column decoder 4 selects a bitline. A block selector circuit 5 selects a block 1. When a read operation is performed, the data read out from a selected memory cell onto a bitline is sensed by the column decoder/sense circuit 3 so as to be output. On the other hand, when a write operation is performed, externally input data is written into a selected memory cell.

An erase/write voltage generator circuit 6 is a booster circuit for generating a high voltage (12 V) in accordance with a power supply voltage VCC externally supplied, and supplies the high voltage to the write state machine 2, thereby performing the erase operation and the write operation of the flash memory. It is noted that, when the flash memory of this example performs a negative gate erase method, the erase/write voltage generator circuit 6 generates a negative voltage instead of a high voltage.

A command state machine 7 is a circuit for supplying externally input control signals such as a chip enable signal /CE, a write enable signal /WE and an output enable signal /OE to the write state machine 2 and for determining the type of a command based on the externally input data and address. An activated chip enable signal /CE (L level) indicates that the flash memory is to be accessed. An activated write enable signal /WE (L level) indicates that a write access is to be performed. An activated output enable signal /OE (L level) indicates that a read access is to be performed. During one to several bus cycles, the command state machine 7 detects what type of access is to be performed based on these control signals, and determines the type of a command by determining whether or not the values of the input data and/or the input address are predetermined values. The determined command is supplied to the write state machine 2, thereby performing a write operation, an erase operation or the like. Also, the command state machine 7 is initialized in response to an externally input reset signal which is supplied when the power is turned ON or the system is reset.

Examples of the commands to be determined by the command state machine 7 are shown in the following Table 1.

TABLE 1

| Commands | First write cycle | | Second write cycle | |
|---|---|---|---|---|
| | Address | Data | Address | Data |
| Data write | Don't care | 40 H | WA | WD |
| Block erase | Don't care | 20 H | BA | D0H |
| Lock block | Don't care | 77 H | BA | D0H |

It is noted that only the commands given when both the first and the second bus cycles are write cycles are shown in Table 1. Thus, in either of these bus cycles, addresses and data are supplied by activating (turning to the L level) the chip enable signal /CE and the write enable signal /WE. However, for example, when a read status register command (not shown in Table 1) is given, the chip enable signal /CE and the output enable signal /OE are activated (turned to the L level) in the second bus cycle, thereby reading data stored in a status register. There are commands which are executed only during the first bus cycle. As the number of bus cycles are increased, it become less likely that these commands are accidentally executed by an unintentional access. Thus, the number of bus cycles may be 3 or more. However, if the number of bus cycles is too large, then the time required for executing the commands becomes too long so that the flash memory can no longer be used conveniently.

In Table 1, when the data supplied during the first write cycle is 40H (in this specification, "H" means that the numerical value including H is a hexadecimal representation), the command state machine 7 determines the command to be a data write command and makes the write state machine 2 perform a write operation based on the write address WA and the write data WD supplied during the second write cycle. On the other hand, when the data supplied during the first and the second write cycles are 20H and D0H, respectively, the command state machine 7 determines the command to be a block erase command and makes the write state machine 2 perform an erase operation based on the block address BA supplied during the second write cycle. As described above, since the execution of the erase operation requires several hundreds of milliseconds, the abnormal end of the erase operation is possible because of the cut off of the power and the input of a device reset signal. The EC data storage region 1b provided for each block 1 determines whether or not such an abnormal end has occurred during the erase operation. Furthermore, when the data supplied during the first and the second write cycles are 77H and D0H, respectively, the command state machine 7 determines the command to be a lock block command and makes the write state machine 2 store BP data in the BP data storage region 1a in the block 1 based on the lock block address BA supplied during the second write cycle. It is noted that when power is cut off or the like during the execution of the lock block command, the BP data cannot be correctly stored in the BP data storage region 1a and an erase or a write with respect to the block 1 is unintentionally enabled. Thus, the data stored in the block 1 cannot be protected. However, unlike the case of an erase operation, the time required for executing the lock block command is only on the order of several tens of microseconds. Thus, the possibility of the generation of such an abnormality is substantially negligible.

In the flash memory of this example, a WP set command and a WP release command are executed in accordance with a command input method, instead of providing a /WP input terminal for inputting an externally supplied /WP signal. Thus, a WP signal generator circuit 8 is provided to be integrated with the command state machine 7 for accepting the commands shown in the following Table 2.

TABLE 2

| Command | First write cycle | | Second write cycle | |
| --- | --- | --- | --- | --- |
| | Address | Data | Address | Data |
| WP release | Don't care | 47 H | FFH | D0H |
| WP set | Don't care | 57 H | FFH | D0H |

Specifically, when the data supplied during the first write cycles is 47H and the address and the data supplied during the second write cycle are FFH and D0H, respectively, the command state machine 7 determines the command to be a WP release command and turns the WP signal output by the WP signal generator circuit 8 to the L level (inactive). On the other hand, when the data supplied during the first write cycles is 57H and the address and the data supplied during the second write cycle are FFH and D0H, respectively, the command state machine 7 determines the command to be a WP set command and turns the WP signal output by the WP signal generator circuit 8 to the H level (active). When the BP data has been stored in the BP data storage region 1a of any block 1 in response to the lock block command, the WP signal may also be automatically turned to the H level (or activated). Moreover, when the power is turned ON or the system is reset, the WP signal is set at the H level (activated) for preventing the data from being broken even when the WP set command fails to be supplied thereafter.

The WP signal output by the WP signal generator circuit 8 is supplied to the write state machine 2. Only when the WP signal has been activated (H level), the write state machine 2 regards the BP data stored in the BP data storage region 1a of each block 1 as being valid, thereby protecting the data stored in the block 1. That is to say, as shown in the following Table 3,

TABLE 3

| WP signal | BP data storage region 1a | Erase/write operations |
| --- | --- | --- |
| H | BP data | Disabled |
| | Other data | Enabled |
| L | BP data | Enabled |
| | Other data | Enabled |

If the WP signal is at the H level (activated), even when the data write command or the block erase command is input, the write state machine 2 disables the erase or the write operation with respect to a block 1 in which the BP data has been stored in the BP data storage region 1a, except for a case to be described below. However, even if the WP signal is at the H level (activated), the write state machine 2 enables the erase and the write operations with respect to a block 1 in which the BP data has not been stored. On the other hand, if the WP signal is at the L level (deactivated), the write state machine 2 enables the erase and the write operations with respect to all the blocks 1 irrespective of whether or not the BP data has been stored therein. Thus, once the BP data has been stored in the BP data storage region 1a of a block, the data of the block 1 cannot be rewritten in principle unless the WP signal is turned to the L level (deactivated) by the WP release command.

When the erase operation of a block 1 is performed, the write state machine 2 also erases the data stored in the BP data storage region 1a of the block 1, thereby rewriting the data into data other than the BP data. When the data stored in the BP data storage region 1a is erased, all the bits of the data become "1". Thus, if the BP data is defined to be data including "0" bits, then only the execution of the erase of the data from the BP data storage region 1a can rewrite the data into data other than the BP data. The protect state is released by rewriting the BP data stored in the BP data storage region 1a only when this erase operation is performed, and thus no command for directly rewriting the BP data only is provided. When the write state machine 2 performs the erase of the block 1, the write state machine 2 also erases the data stored in the EC data storage region 1b of the block 1. Then, after this erase operation is completed, the write state machine 2 writes the EC data therein. The data stored in the EC data storage region 1b is rewritten only when this erase operation is performed.

The write state machine 2 supplies data $R_1$ and $R_2$ representing the contents stored in the BP data storage region 1a and the EC data storage region 1b to the command state machine 7 when the erase operation or the write operation is completed. These data $R_1$ and $R_2$ may be the data themselves stored in the BP data storage region 1a and the EC data storage region 1b, respectively. However, the data $R_2$ is assumed to be data of one bit represented as "0" when the EC data has been stored in the EC data storage region 1b, and as "1" when the EC data has not been stored in the EC data storage region 1b. The data $R_1$ is assumed to be data of one bit represented as "0" when the BP data has been stored in the BP data storage region 1a, and as "1" when the BP data has not been stored in the BP data storage region 1a. If the command state machine 7 detects that the chip enable signal /CE and the output enable signal /OE have been activated (L level) while the block erase command or the data write command is input to the command state machine 7 and the write state machine 2 performs the commanded operation, the command state machine 7 reads out these data $R_1$ and $R_2$.

A status register (not shown in FIG. 1) indicating the internal state of the flash memory is further provided for the command state machine 7. As shown in FIG. 2, data of eight bits (or one byte) is stored in the status register and is rewritten by the command state machine 7 when necessary. The most significant WSMS (write state machine status) bit stored in the status register is a bit indicating whether the flash memory is accessible or inaccessible because the flash memory is in an operation state. The second most significant ESS (erase-suspend status) bit is a bit indicating whether or not the flash memory is in an erase-suspend state. The erase suspension is a manipulation by which the erase is suspended during an erase operation and thereby the access to other blocks is enabled. An ES (erase status) bit is a bit indicating whether the erase has succeeded or failed. It is noted that the "failure" of the erase does not refer the abnormal end of the erase but to a case where a complete erase has not been confirmed by an erase verification although the erase has been repeated several times during the erase operation. A DWS (data-write status) bit is a bit indicating whether the write has succeeded or failed. A VPPS (Vpp status) bit is a bit indicating whether or not an operation has been stopped because of an abnormal decrease in power supply voltage. The three least significant bits $R_2$ to $R_o$ are currently undefined reserved bits. The contents of the eight bits stored in the status register can be read out in response to the read status register command. When the write state machine 2 outputs the data of two bits $R_1$ and $R_2$, the write state machine 2 may simultaneously read the contents of the eight bits stored in the status register. That is to say, the data $R_1$ and $R_2$ representing the contents stored in the BP data storage region 1a and the EC data storage region 1b may be assigned to the reserved bits $R_1$ and $R_2$ of the status register so as to be output. By simultaneously reading out the contents stored in the BP data storage region 1a and the EC data storage region 1b as well as the contents stored in the status register, not only the abnormal end of an erase operation but also the failure of an erase or a write can be detected simultaneously.

When the write state machine 2 performs an erase operation and a write operation, the write state machine 2 makes reference to the EC data storage region 1b of the object block 1. If the EC data has been stored in the EC data storage region 1b, the write state machine 2 disables the erase operation with respect to the block 1 following the above-described principles, i.e., if the WP signal has been activated (H level) and the BP data has been stored in the BP data storage region 1a. However, if the EC data has not been stored in the EC data storage region 1b, the write state machine 2 does not disable but enables the erase operation with respect to the block 1, even when the WP signal has been activated (H level) and the BP data has been stored in the BP data storage region 1a. That is to say, it is not until the erase operation has been completed that the EC data is written into the EC data storage region 1b. Thus, in the case of the abnormal end of the erase operation, it is general that data other than the EC data remains stored in the EC data storage region 1b. Thus, in the case where the EC data has been stored in the EC data storage region 1b, it is possible to determine that the previously performed erase operation has ended normally. On the other hand, in the case where the EC data has not been stored in the EC data storage region 1b, it is possible to determine that the previously performed erase operation has ended abnormally. Thus, since unerased data is possibly left in the block 1 in such a case, it is no use performing an access unless a re-erase is performed.

In a system using a flash memory having the above-described configuration, in the case where an erase or a write has been performed with respect to any of the blocks 1, the chip enable signal /CE and the output enable signal /OE are activated and the data $R_1$ and $R_2$ representing the contents stored in the BP data storage region 1a and the EC data storage region 1b, as well as the contents of the status register, are read out, thereby determining whether or not the EC data has been stored in the EC data storage region 1b. If it is determined that the EC data has not been stored in the EC data storage region 1b based on the data $R_2$, then it is determined that the previously performed erase operation has ended abnormally. Thereafter, a block erase command is supplied, thereby performing the erase operation of the block 1 again. In such a case, even when the WP signal has been activated (H level), the BP data has been stored in the BP data storage region 1a and the data stored in the block 1 is in a protect state, the write state machine 2 can perform the erase operation with respect to the block 1.

In this example, a case where the data $R_1$ and $R_2$ representing the contents of the BP data storage region 1a and the EC data storage region 1b can be read has been described. However, even if these data cannot be read, the abnormal end of the erase operation can be detected by reading all the data after the erase operation has been performed or if the write has failed. In addition, even when the abnormal end of the erase operation has been detected in such a manner, the re-erase of the block 1 can be performed with certainty irrespective of the states of the WP signal and the BP data storage region 1a.

Herein, consider a case where the BP data storage region 1a is a region of one bit. In this case, if the BP data is represented as "0", then the data "0" is written into the BP data storage region 1a by a program before erase operation on the first stage of the erase operation. Thus, in the case where an abnormal end occurs before the initialization of the data stored in the BP data storage region 1a into "1" or the erase operation has been completed, a state where the BP data happens to be stored in the BP data storage region 1a causes after the abnormal end of the erase operation. On the other hand, if the BP data is represented as "1", then it is necessary to newly write data "0" or the data other than the BP data after the initialization of the data stored in the BP data storage region 1a into "1" or the erase operation has been completed. However, if an abnormal end occurs immediately before the write of "0", then a state where the BP data happens to be stored in the BP data storage region 1a occurs after the abnormal end of the erase operation. Thus, in both of these cases, if the erase operation has ended abnormally, then the data stored in the block 1 is unnecessarily protected.

Nevertheless, the same situation is also caused if the EC data storage region 1b is a region of one bit. Thus, no matter whether the EC data is represented as "0" or "1", if the abnormal end of an erase operation has occurred, then the EC data happens to be stored in the EC data storage region 1b and the abnormal end cannot be detected in some cases. Therefore, if the EC data storage region 1b is defined as a region of one bit, the abnormal end of an erase operation cannot always be detected with certainty, though the detection possibility of the abnormal end of the erase operation can be increased to a certain degree by adjusting the times at which the program before erase and the erase are performed with respect to the EC data storage region 1b.

Thus, in this example, each of the BP data storage region 1a and the EC data storage region 1b is defined as a region of two bits. More specifically, as shown in FIG. 3A, it is assumed that the BP data storage region 1a is composed of two bits $b_1$ and $b_0$, while the EC data storage region 1b is composed of two bits $b_3$ and $b_2$. Also, the write operations of these bits $b_3$ to $b_0$ are performed in the descending order of the subscripts of these bits, i.e., $b_3 \rightarrow b_2 \rightarrow b_1 \rightarrow b_0$. In this case, each of the BP data and the EC data is represented as data of two bits "10" (in this specification, the numerical value within the parentheses is a binary representation). Thus, even if the abnormal end of an erase operation occurs, there is no possibility that the BP data happens to be stored in the BP data storage region 1a or the EC data happens to be stored in the EC data storage region 1b.

For example, if the abnormal end of an erase operation occurs immediately after the data "0" has been written into the respective bits in the BP data storage region 1a and the EC data storage region 1b during the program before erase on the first stage of the erase operation, then data "00" is left in the BP data storage region 1a and the EC data storage region 1b. On the other hand, if the abnormal end of an erase operation occurs on the stage where the data stored in the BP data storage region 1a and the EC data storage region 1b has been erased completely but unerased data still exists in the block 1 and thus the erase operation is required to be further repeated, then data "11" is left in the BP data storage region 1a and the EC data storage region 1b. Furthermore, if the abnormal end of an erase operation occurs during a short period after data "0" has been written into the first bit $b_1$ of the BP data storage region 1a or the first bit $b_3$ of the EC data storage region 1b by the program before erase and before the data "0" is written into the next bit $b_0$ or $b_2$, there is a slight possibility that data "01" is left in the BP data storage region 1a or the EC data storage region 1b. However, no matter when the abnormal end occurs during the erase operation, there is no possibility that data "10" is left in the BP data storage region 1a or the EC data storage region 1b. Thus, assuming that the BP data and the EC data are defined as "10" and the EC data is written into the EC data storage region 1b on the last stage of the erase operation, the EC data can be written into the EC data storage region 1b only when the erase operation has ended normally. In addition, even if the erase operation has ended abnormally, there is no possibility that the BP data happens to be stored in the BP data storage region 1a.

Figure 5:
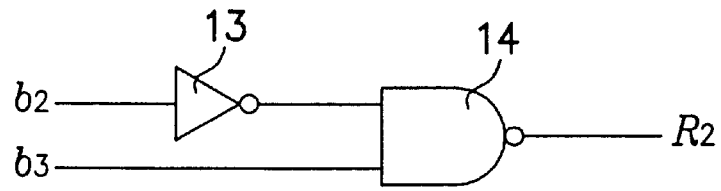
FIG. 5 is a circuit diagram of a circuit for reading out the data stored in the EC data storage region in the example of the present invention.

By defining the BP data and the EC data as "10", an erase/write disabled state is indicated when the bits $b_1$ and $b_0$ are "10" and an erase/write enabled state is indicated when these bits are other data, as shown in FIG. 3B. On the other hand, the normal end of an erase operation is indicated when the bits $b_3$ and $b_2$ are "10" and the abnormal end of the erase operation is indicated when the bits are other data, as also shown in FIG. 3B. In addition, by defining the BP data and the EC data as "10", the bits $b_1$ and $b_0$ in the BP data storage region 1a can be supplied as a bit $R_1$ to the command state machine 7 via an inverter 11 and a NAND gate 12, as shown in FIG. 4. In this case, the bit $R_1$ becomes "0" when the BP data has been stored in the BP data storage region 1a and becomes "1" when other data is stored therein. Furthermore, the bits $b_3$ and $b_2$ in the EC data storage region 1b can be supplied as a bit $R_2$ to the command state machine 7 via an inverter 13 and a NAND gate 14, as shown in FIG. 5. In this case, the bit $R_2$ becomes "0" when the EC data has been stored in the EC data storage region 1b and becomes "1" when other data is stored therein.

Also, the BP data storage region 1a and the EC data storage region 1b may be regions of three bits. In such a case, if the abnormal end of an erase operation occurs immediately after the program before erase has been completed, then data "000" is left in the BP data storage region 1a and the EC data storage region 1b. On the other hand, if the abnormal end of an erase operation occurs on the stage where only the data stored in the BP data storage region 1a and the EC data storage region 1b has been erased completely but unerased data still exists in the block 1, then data "111" is left in the BP data storage region 1a and the EC data storage region 1b. Furthermore, if the abnormal end of an erase operation occurs during the program before erase with respect to the BP data storage region 1a or the EC data storage region 1b, there is a slight possibility that data "011" or "001" is left in the BP data storage region 1a or the EC data storage region 1b. However, at no matter which stage the abnormal end occurs during the erase operation, there is no possibility that any of data "010", data "100", data "101" and data "110" is left in the BP data storage region 1a or the EC data storage region 1b. That is to say, each of the data "010", the data "100", the data "101" and the data "110" has somewhere a series of bits "10" in which a previously written bit represents a state where the erase has been performed ("1") and a subsequently written bit represents the inversed state thereof ("0"). Thus, the BP data and the EC data may be defined as any of these data. It is noted that the BP data storage region 1a and the EC data storage region 1b may also be regions of four bits or more. In such a case, though the possibility of an accidental coincidence can be eliminated with more certainty, a storage region of 1 byte (8 bits) or more becomes necessary for a single block 1 and thus the circuit size is possibly increased too much.

It is noted that, when an erase operation is performed, a program before erase with respect to the EC data storage region 1b is preferably performed at first. The reason is as follows. If a program before erase is first performed with respect to the memory cells within the block 1 and if an abnormal end occurs during the program before erase, then the previous EC data is left in the EC data storage region 1b so that the abnormal end cannot be detected. Furthermore, the write of the EC data for completing the erase operation is preferably performed at as late a stage as possible of the erase operation, as described above. The reason is as follows. If the EC data is written before the data within the block 1 has not been erased completely, then the EC data remains stored in the EC data storage region 1b even when the abnormal end occurs thereafter.

As described above, in the flash memory of the present example, if the erase operation of the block 1 has ended abnormally, the EC data is not written into the EC data storage region 1b of the block 1. That is to say, if there is any possibility that the erase of the data within the block 1 is incomplete because of such an abnormal end of the erase operation, then the EC data is not written into the EC data storage region 1b of the block 1. Thus, the re-erase of the block 1 can be performed with certainty irrespective of the states of a WP signal and the BP data storage region 1a, and it is no longer necessary to issue a WP release command for switching the WP signal. In addition, by defining the BP data and the EC data as data of two bits or more, e.g., "10" or "100", even when the abnormal end of an erase operation occurs, there is no possibility that the data stored in the BP data storage region 1a and the EC data storage region 1b happen to respectively coincide with the BP data and the EC data. Consequently, such an abnormal end can be detected with certainty.

Figure 6:
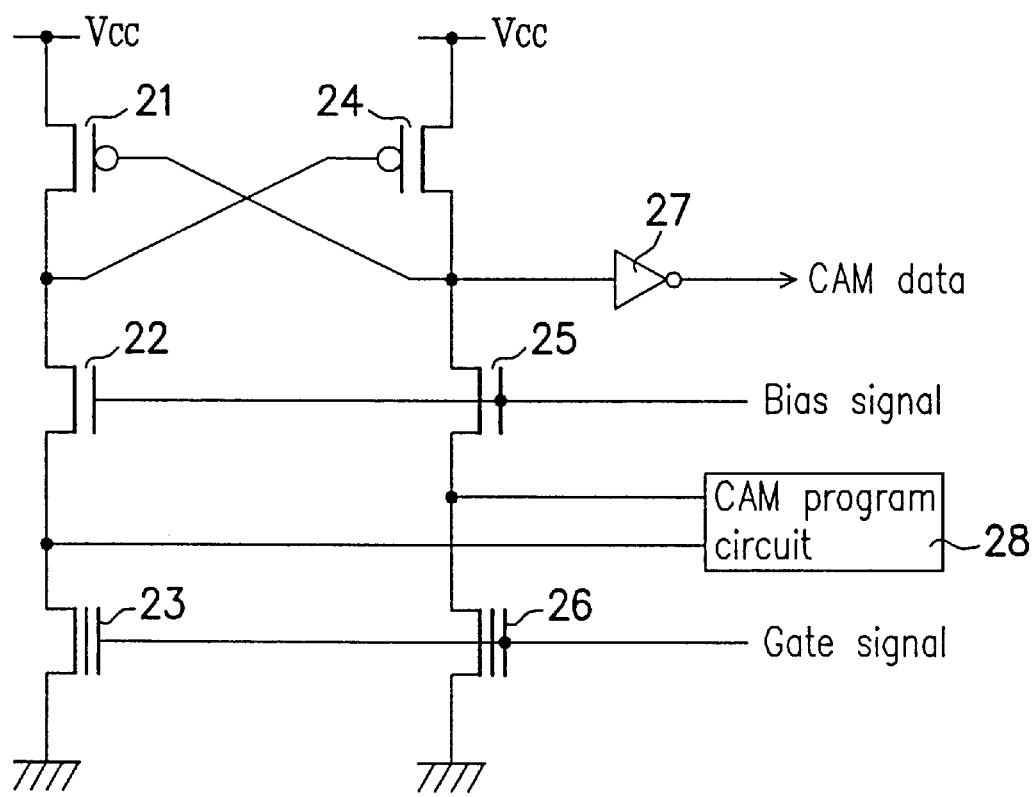
FIG. 6 is a circuit diagram showing a configuration of a CAM circuit in the example of the present invention.

When the BP data storage region 1a and the EC data storage region 1b are not provided within each block 1, a CAM (content addressable memory) circuit may be used instead. A CAM circuit corresponding to one bit is shown in FIG. 6. The CAM circuit includes a circuit section in which a P-channel MOSFET 21, an N-channel MOSFET 22 and a cell transistor 23 of the flash memory are serially connected between a power supply VCC and a ground and another circuit section having a similar configuration in which a P-channel MOSFET 24, an N-channel MOSFET 25 and a cell transistor 26 of the flash memory are serially connected between the power supply VCC and the ground. In the CAM circuit, the gates of the P-channel MOSFETs 21 and 24 are connected to the drains of the N-channel MOSFETs 25 and 22, respectively, and a bias voltage of about 2 V is applied to the gates of N-channel MOSFETs 22 and 25, thereby outputting CAM data from the drain of the P-channel MOSFET 24 via an inverter 27. In the case of writing data into the CAM circuit, a high-voltage gate signal of about 12 V is input to the control gates of the cell transistors 23 and 26 and a CAM program circuit 28 applies complementary program voltages (one of which is about 7 V and the other of which is 0 V) to the drains of the cell transistors 23 and 26. Then, a write is performed with respect to one of the cell transistors 23 and 26 and a potential difference is caused between the threshold voltages of the cell transistors 23 and 26. Thus, by inputting a gate signal obtained from the power supply VCC to the control gates of the cell transistors 23 and 26, arbitrary CAM data of one bit can be obtained.

When the BP data storage region 1a and the EC data storage region 1b are implemented as such a CAM circuit, the contents of the BP data storage region 1a and the EC data storage region 1b can always be output as CAM data only by applying a bias voltage to the gates of the N-channel MOSFETs 22 and 25 and inputting a gate signal obtained from the power supply VCC to the control gates of the cell transistors 23 and 26. As a result, an access time can be shortened.

In this example, only a case where the re-erase of a block 1 is enabled if the EC data has not been stored in the EC data storage region 1b of the block 1 has been described. However, in the case where the EC data has not been stored in the EC data storage region 1b, the write state machine 2 can also disable the write to the block 1, even if the WP signal has been deactivated (L level) or data other than the BP data has been stored in the BP data storage region 1a. In addition, the write state machine 2 can also disable the execution of a lock block command for writing the BP data into the BP data storage region 1a of the block 1. Since the write state machine 2 can not only enable an erase, but also disable a write or a lock block, it is possible to prevent data from being erroneously written or protected in vain without knowing that the erase of the data within the block 1 is possibly incomplete.

In the foregoing example, only the BP data storage region 1a and the EC data storage region 1b are provided for each block 1. However, an unconditional BP data storage region 1c may be additionally provided. The unconditional BP data storage region 1c may have the same configuration as that of the BP data storage region 1a and the EC data storage region 1b. Also, unconditional BP data to be stored in the region 1c may be the same as the BP data and the EC data. When the BP data storage region 1a, the EC data storage region 1b and the unconditional BP data storage region 1c are regions of two bits, the BP data storage region 1a may be composed of two bits $b_1$ and $b_0$ the EC data storage region 1b may be composed of two bits $b_3$ and $b_2$ and the unconditional BP data storage region 1c may be composed of two bits $b_5$ and $b_4$, as shown in FIG. 7A.

When unconditional BP data "10", for example, has been stored in the unconditional BP data storage region 1c of a block 1, the write state machine 2 disables the erase operation and the write operation with respect to the block 1 irrespective of the state of the WP signal. However, when data other than unconditional BP data has been stored in the unconditional BP data storage region 1c, the write state machine 2 limits the erase operation and the write operation in accordance with the WP signal and the contents of the BP data storage region 1a. In order to write unconditional BP data into the unconditional BP data storage region 1c, an unconditional BP data set command is provided for the command state machine 7. The unconditional BP data set command is executed, for example, by supplying data 78H during the first write cycle and supplying data D0H and the block address of a block 1 to be protected during the second write cycle. However, once the unconditional BP data has been stored in the unconditional BP data storage region 1c, the protect cannot be released by any command. Thus, an erase operation or a write operation cannot be performed unless a high voltage equal to or higher than the power supply voltage VCC is applied to a particular terminal. Consequently, a block 1 in which the unconditional BP data has been stored in the unconditional BP data storage region 1c thereof can be used as a storage block for a BIOS (basic input/output system) or the like in the same way as a boot block in a flash memory of a boot block type.

If the erase operation of a block 1 has ended abnormally and data other than the EC data has been stored in the EC data storage region 1b, the write state machine 2 can disable the execution of an unconditional BP data set command for writing the unconditional BP data into the unconditional BP data storage region 1c of the block 1. In the case where there is any possibility that the erase of the data within the block 1 is incomplete, it is possible to prevent data from being erroneously protected by disabling the execution of the unconditional BP data set command. In addition, the contents of the unconditional BP data storage region 1c may also be read out in the same way as those of the BP data storage region 1a and the EC data storage region 1b, thereby detecting the protect state thereof easily.

In the foregoing example, a flash memory of a NOR type or a NAND type has been described. Alternatively, the present invention is also applicable to a flash memory of an AND type or a DINOR type. However, in the flash memory of the AND type or the DINOR type, the injection and the drainage of the electrons into/from the floating gate FG during an erase and a write are performed in the opposite manner to that of the flash memory of the NOR type or the NAND type. Thus, the relationships between the levels of the threshold values are also opposite in these two cases.

Moreover, in the foregoing example, a flash memory including cell transistors with a floating gate FG has been described. However, the present invention is not limited thereto, but applicable to other types of nonvolatile semiconductor memory devices including cell transistors having a MOSFET structure in which a ferroelectric thin film is used as the gate oxide film thereof. In the case where the data is stored in a nonvolatile manner by utilizing the inversion of polarization of a ferroelectric thin film, it is not necessary to use a super thin tunnel oxide film. As a result, the integrity can be further improved.

Furthermore, the present invention is also applicable to a nonvolatile semiconductor memory device in which a ferroelectric thin film is used as a capacitor section of a DRAM (dynamic random access memory). However, since such a nonvolatile semiconductor memory device can directly rewrite data, an independent erase operation does not exist. Thus, in such a case, instead of providing the EC data storage region 1b for each block 1, a rewrite invalid data storage region is provided for storing rewrite invalid data similar to the EC data if the rewrite operation of data has not ended normally. In the case where the rewrite invalid data has not been stored in the rewrite invalid data storage region, the rewrite of the data stored in the block 1 is disabled. Herein, the abnormal end of the rewrite operation of data refers to a case where data has not been rewritten normally because of an abnormality caused by a power supply during the rewrite operation and other causes. Furthermore, in such a nonvolatile semiconductor memory device, the operation thereof can be controlled only by the use of control signals. Thus, the command state machine 7 is no longer necessary and a circuit for identifying a read, a write and the like in response to these control signals has only to be provided. Moreover, the write state machine 2 may also be replaced by a write circuit. Furthermore, the present invention may also be implemented as a nonvolatile semiconductor memory device to be fabricated together with a CPU and the like on the same chip.

As is apparent from the foregoing description, in the nonvolatile semiconductor memory device according to the present invention, if the erase operation of a block has ended abnormally and the erase of the block is possibly incomplete, the re-erase of the block can be surely executed. As a result, it is no longer necessary to provide a circuit for deactivating a write protect signal or to additionally execute an error correction routine for inputting a command for deactivating the write protect signal, thereby preventing the circuit configuration or the program of a system using this flash memory from being complicated.

In addition, in the nonvolatile semiconductor memory device according to the present invention, it is possible to prevent data from being erroneously written into a block without knowing that the erase operation of the data from the block has ended abnormally.

Moreover, in the nonvolatile semiconductor memory device according to the present invention, it is possible to prevent data in a block from being erroneously protected without knowing that the erase operation of the data from the block has ended abnormally.

Furthermore, in the nonvolatile semiconductor memory device according to the present invention, it is less likely that the data stored in the block protect data storage region and the erase complete data storage region happen to coincide with the block protect data and the erase complete data, respectively, even in the case of the abnormal end of the block erase. As a result, it is possible to surely deal with the abnormal end of the erase.

Furthermore, in the nonvolatile semiconductor memory device according to the present invention, it is easy to externally determine whether or not the erase operation of a block has ended normally or to determine whether or not the data in the block is protected.

Furthermore, in the nonvolatile semiconductor memory device according to the present invention, it is possible to protect the data in an arbitrary block irrespective of a write protect signal.

Furthermore, in the nonvolatile semiconductor memory device according to the present invention, it is possible to prevent data in a block from being unconditionally protected without knowing that the erase operation of the data from the block has ended abnormally.

Furthermore, in the nonvolatile semiconductor memory device according to the present invention, it is less likely that the data stored in the unconditional block protect data storage region happens to coincide with the unconditional block protect data even in the case of the abnormal end of the block erase and it is surely possible to prevent the data in the block from being erroneously protected.

Furthermore, in the nonvolatile semiconductor memory device according to the present invention, it is easy to externally determine whether or not the data in each block is protected.

According to another aspect of the present invention, if the rewrite operation of data in a block of a nonvolatile semiconductor memory device using a ferroelectric or the like has not ended abnormally, it is possible to prevent the data from being erroneously written into the block.

Furthermore, in the nonvolatile semiconductor memory device according to the present invention, it is possible to prevent data in a block from being erroneously protected without knowing that the rewrite operation of the data in the block has ended abnormally. Furthermore, it is also possible to define a state where all the bits within a block have been erased as an erase complete state by regarding all the bits within a block as forming an erase complete bit region.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A nonvolatile semiconductor memory device enabling an erase of data from at least one of blocks obtained by dividing a memory cell array, on the basis of each of the blocks and enabling a write of data only to the at least one block from which the data has been erased, the nonvolatile semiconductor memory device comprising:

the memory cell array for storing data therein in a nonvolatile manner;

block protect data storage regions, provided for the respective blocks, for storing data therein in a nonvolatile manner; and block protect means for disabling an erase of data from and a write of data into a block, if block protect data has been stored in the block protect data storage region of the block and a write protect signal has been activated, wherein the nonvolatile semiconductor memory device further comprises:

erase complete data storage regions, provided for the respective blocks, for storing data therein in a nonvolatile manner;

erase complete data set means for writing erase complete data into the erase complete data storage region of a block after an erase of data from the block has been completed; and re-erase enable means for enabling an erase of data from a block if the erase complete data has not been stored in the erase complete data storage region of the block, irrespective of a function of the block protect means.

2. A nonvolatile semiconductor memory device according to claim 1, wherein the re-erase enable means disables a write of data into a block if the erase complete data has not been stored in the erase complete data storage region of the block, irrespective of the function of the block protect means.

3. A nonvolatile semiconductor memory device according to claim 1, wherein the re-erase enable means disables a write of the block protect data into the block protect data storage region of a block if the erase complete data has not been stored in the erase complete data storage region of the block.

4. A nonvolatile semiconductor memory device according to claim 1, wherein each of the block protect data and the erase complete data is composed of a series of at least two bits in which a previously written bit is a bit representing a state where an erase has been performed and a subsequently written bit is a bit representing an inversed state thereof, and wherein the block protect data of at least two bits and the erase complete data of at least two bits are respectively stored in each of the block protect data storage regions and each of the erase complete data storage regions in a nonvolatile manner.

5. A nonvolatile semiconductor memory device according to claim 4, further comprising block status data read means for reading out the data stored in the block protect data storage region and the data stored in the erase complete data storage region.

6. A nonvolatile semiconductor memory device according to claim 1, further comprising block status data read means for reading out the data stored in the block protect data storage region and the data stored in the erase complete data storage region.

7. A nonvolatile semiconductor memory device according to claim 1, further comprising unconditional block protect data storage regions, provided for the respective blocks, for storing data therein in a nonvolatile manner, and unconditional block protect means for disabling an erase of data from and a write of data into a block, if unconditional block protect data has been stored in the unconditional block protect data storage region of the block, irrespective of the write protect signal.

8. A nonvolatile semiconductor memory device according to claim 7, wherein the re-erase enable means disables a write of the unconditional block protect data into the unconditional block protect data storage region of a block if the erase complete data has not been stored in the erase complete data storage region of the block.

9. A nonvolatile semiconductor memory device according to claim 7, wherein the unconditional block protect data is composed of a series of at least two bits in which a previously written bit is a bit representing a state where an erase has been performed and a subsequently written bit is a bit representing an inversed state thereof, and wherein the unconditional block protect data of at least two bits is stored in each of the unconditional block protect data storage regions in a nonvolatile manner.

10. A nonvolatile semiconductor memory device according to claim 7, further comprising unconditional block protect data read means for reading out the data stored in the unconditional block protect data storage region.

11. A nonvolatile semiconductor memory device enabling a direct rewrite of data in at least one of blocks obtained by dividing a memory cell array and comprising:

the memory cell array for storing data therein in a nonvolatile manner;

block protect data storage regions, provided for the respective blocks, for storing data therein in a nonvolatile manner; and block protect means for disabling a rewrite of data in a block, if block protect data has been stored in the block protect data storage region of the block and a write protect signal has been activated, wherein the nonvolatile semiconductor memory device further comprises:

rewrite invalid data storage regions, provided for the respective blocks, for storing data therein in a nonvolatile manner;

rewrite invalid data set means for writing rewrite invalid data into the rewrite invalid data storage region of a block when a rewrite operation of data in the block has not ended normally; and data rewrite disable means for disabling a rewrite of data in a block if the rewrite invalid data has been stored in the rewrite invalid data storage region of the block, irrespective of a function of the block protect means.

12. A nonvolatile semiconductor memory device according to claim 11, wherein the data rewrite disable means disables a write of the block protect data into the block protect data storage region of a block if the rewrite invalid data has been stored in the rewrite invalid data storage region of the block.

* * * * *